United States Patent
Tomida et al.

(10) Patent No.: US 12,479,481 B2
(45) Date of Patent: Nov. 25, 2025

(54) OBSTACLE DETECTION DEVICE AND OBSTACLE DETECTION METHOD

(71) Applicant: Mitsubishi Electric Corporation, Tokyo (JP)

(72) Inventors: Masashi Tomida, Tokyo (JP); Yukitoshi Inaba, Tokyo (JP); Keita Mochizuki, Tokyo (JP); Yasuhito Hashiba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 774 days.

(21) Appl. No.: 17/787,778

(22) PCT Filed: Dec. 23, 2019

(86) PCT No.: PCT/JP2019/050398
§ 371 (c)(1),
(2) Date: Jun. 21, 2022

(87) PCT Pub. No.: WO2021/130824
PCT Pub. Date: Jul. 1, 2021

(65) Prior Publication Data
US 2023/0076273 A1    Mar. 9, 2023

(51) Int. Cl.
*B61L 23/04* (2006.01)
*B61L 25/02* (2006.01)
(Continued)

(52) U.S. Cl.
CPC .......... *B61L 23/041* (2013.01); *B61L 25/021* (2013.01); *B61L 25/025* (2013.01); *B61L 27/04* (2013.01);
(Continued)

(58) Field of Classification Search
CPC .... B61L 23/041; B61L 25/021; B61L 25/025; B61L 27/04; G01S 17/931; G01S 17/86; G01S 7/4817; G06T 5/73
See application file for complete search history.

(56) References Cited

U.S. PATENT DOCUMENTS 6,163,755 A * 12/2000 Peer ..................... B61L 23/044
701/19
9,129,277 B2 * 9/2015 MacIntosh ................ G06T 7/73
(Continued)

FOREIGN PATENT DOCUMENTS

CN    107399341 A       11/2017
CN    119270304 A  *    1/2025
(Continued)

OTHER PUBLICATIONS

Office Action dated Oct. 18, 2022, issued in corresponding Indian Patent Application No. 202227035592, 6 pages.
(Continued)

*Primary Examiner* — Jason C Smith
(74) *Attorney, Agent, or Firm* — Buchanan Ingersoll & Rooney PC (57) ABSTRACT

An obstacle detection device includes: a sensor unit including a camera, a laser distance measuring device, and an optical element, and setting optical axes of the camera and the laser distance measuring device to an optical axis in the same direction using the optical element; a monitoring area control unit calculating a monitoring area to be monitored by the sensor unit using a position of a train, map information indicating a position of a track of the train, and an attitude angle of the train, and performing control to cause a direction of the optical axis of the sensor unit to be on a course of the train using a drive mirror; and an obstacle determination unit detecting an obstacle on the course of the train based on monitoring results of the camera and the laser (Continued)

distance measuring device, and determining whether a collision avoidance action is necessary.

20 Claims, 9 Drawing Sheets

(51) Int. Cl.
    *B61L 27/04*     (2006.01)
    *G01S 7/481*     (2006.01)
    *G01S 17/86*     (2020.01)
    *G01S 17/931*     (2020.01)
    *G06T 5/73*     (2024.01)

(52) U.S. Cl.
    CPC ............ *G01S 7/4817* (2013.01); *G01S 17/86* (2020.01); *G01S 17/931* (2020.01); *G06T 5/73* (2024.01)

(56) References Cited

U.S. PATENT DOCUMENTS

| | | | | |
|---|---|---|---|---|
| 9,170,327 | B2 * | 10/2015 | Choe | G05D 11/006 |
| 10,860,899 | B2 * | 12/2020 | Porta | G01S 13/867 |
| 11,287,828 | B2 * | 3/2022 | Bai | G06T 7/20 |
| 11,393,219 | B2 * | 7/2022 | Chen | G01S 17/931 |
| 11,726,184 | B2 * | 8/2023 | Ferreira | G01S 17/894 |
| | | | | 356/4.01 |
| 2015/0281587 | A1 | 10/2015 | Furuta et al. | |
| 2023/0076273 | A1 * | 3/2023 | Tomida | G01S 7/4817 |
| 2023/0228884 | A1 * | 7/2023 | Won | B60W 10/18 |
| | | | | 701/301 |
| 2024/0153132 | A1 * | 5/2024 | Matsuno | G01S 17/89 |
| 2024/0338033 | A1 * | 10/2024 | Fujiwara | G01S 17/86 |

FOREIGN PATENT DOCUMENTS

| | | | | |
|---|---|---|---|---|
| EP | 3851872 A1 * | 7/2021 | | B61L 23/041 |
| JP | H05116626 A | 5/1993 | | |
| JP | 07010003 A * | 1/1995 | | |
| JP | H0710003 A | 1/1995 | | |
| JP | 09166452 A * | 6/1997 | | G07C 5/0891 |
| JP | H09166452 A | 6/1997 | | |
| JP | 2009154641 A * | 7/2009 | | |
| JP | 2015195569 A | 11/2015 | | |
| JP | 6464673 B2 | 2/2019 | | |
| JP | 2019181996 A * | 10/2019 | | |
| JP | 2019197418 A * | 11/2019 | | |
| KR | 100716033 B1 * | 5/2007 | | |
| WO | WO-2021130824 A1 * | 7/2021 | | B61L 23/041 |

OTHER PUBLICATIONS

International Search Report (PCT/ISA/210) with translation and Written Opinion (PCT/ISA/237) mailed on Mar. 17, 2020, by the Japan Patent Office as the International Searching Authority for International Application No. PCT/JP2019/050398. (10 pages).

Notice of Reasons for Refusal issued on May 10, 2022 in corresponding JP Application No. 2021-566404. (8 pages).

Office Action dated Mar. 19, 2025, issued in the corresponding Indian Patent Application No. 202227035592, 2 pages.

\* cited by examiner

OBSTACLE DETECTION DEVICE AND OBSTACLE DETECTION METHOD

FIELD

The present invention relates to an obstacle detection device and an obstacle detection method for detecting an obstacle.

BACKGROUND

In a train, it has been conventionally performed to monitor the front of the train by using various sensors, and detect an obstacle on a course of the train. In Patent Literature 1, a technique is disclosed in which an obstacle detection device for a railway vehicle accurately determines the presence or absence of an obstacle and measures a distance to the obstacle, with use of a detection result obtained by a sensor such as an infrared camera or a laser distance measuring sensor.

CITATION LIST

Patent Literature

Patent Literature 1: Japanese Patent Application Laid-open No. H5-116626

SUMMARY

Technical Problem

However, according to the above-mentioned conventional technique, a field of view of the infrared camera is fixed, and an angle of view thereof cannot be narrowed. For that reason, there has been a problem that detection accuracy of the obstacle detected by the infrared camera deteriorates as the distance between the camera and the obstacle increases. For such a problem, a method is conceivable of mechanically moving the field of view of the infrared camera, but in this method, calculation of the laser irradiation direction of the laser distance measuring sensor with respect to the field of view of the infrared camera becomes complicated, which causes a deviation between the laser irradiation direction of the monitoring direction by the infrared camera.

The present invention has been made in view of the above circumstances, and an object thereof is to provide an obstacle detection device that can improve detection accuracy when an obstacle is detected with use of a camera and a laser distance measuring device.

Solution to Problem

In order to solve the above-mentioned problem and achieve the object, the present invention provides an obstacle detection device to be installed on a train, the obstacle detection device comprising: a sensor unit including a camera, a laser distance measuring device, and an optical element, by which an optical axis of the camera and an optical axis of the laser distance measuring device are set to an optical axis in the same direction with use of the optical element; a monitoring area control unit to calculate a monitoring area to be monitored by the sensor unit, with use of a position of the train, map information stored in a map data storage unit and indicating a position of a track on which the train travels, and an attitude angle of the train, and perform control to cause a direction of the optical axis of the sensor unit to be on a course of the train with used of a drive mirror; and an obstacle determination unit to detect an obstacle on the course of the train and determine whether or not a collision avoidance action for avoiding collision with the obstacle is necessary in the train, on the basis of a monitoring result of the camera and a monitoring result of the laser distance measuring device.

Advantageous Effects of Invention

According to the present invention, there is an effect that the obstacle detection device can improve detection accuracy when an obstacle is detected by using a camera and a laser distance measuring device.

DESCRIPTION OF EMBODIMENTS

Hereinafter, an obstacle detection device and an obstacle detection method according to embodiments of the present invention will be described in detail with reference to the drawings. Note that, the invention is not necessarily limited by these embodiments.

First Embodiment

Figure 1:
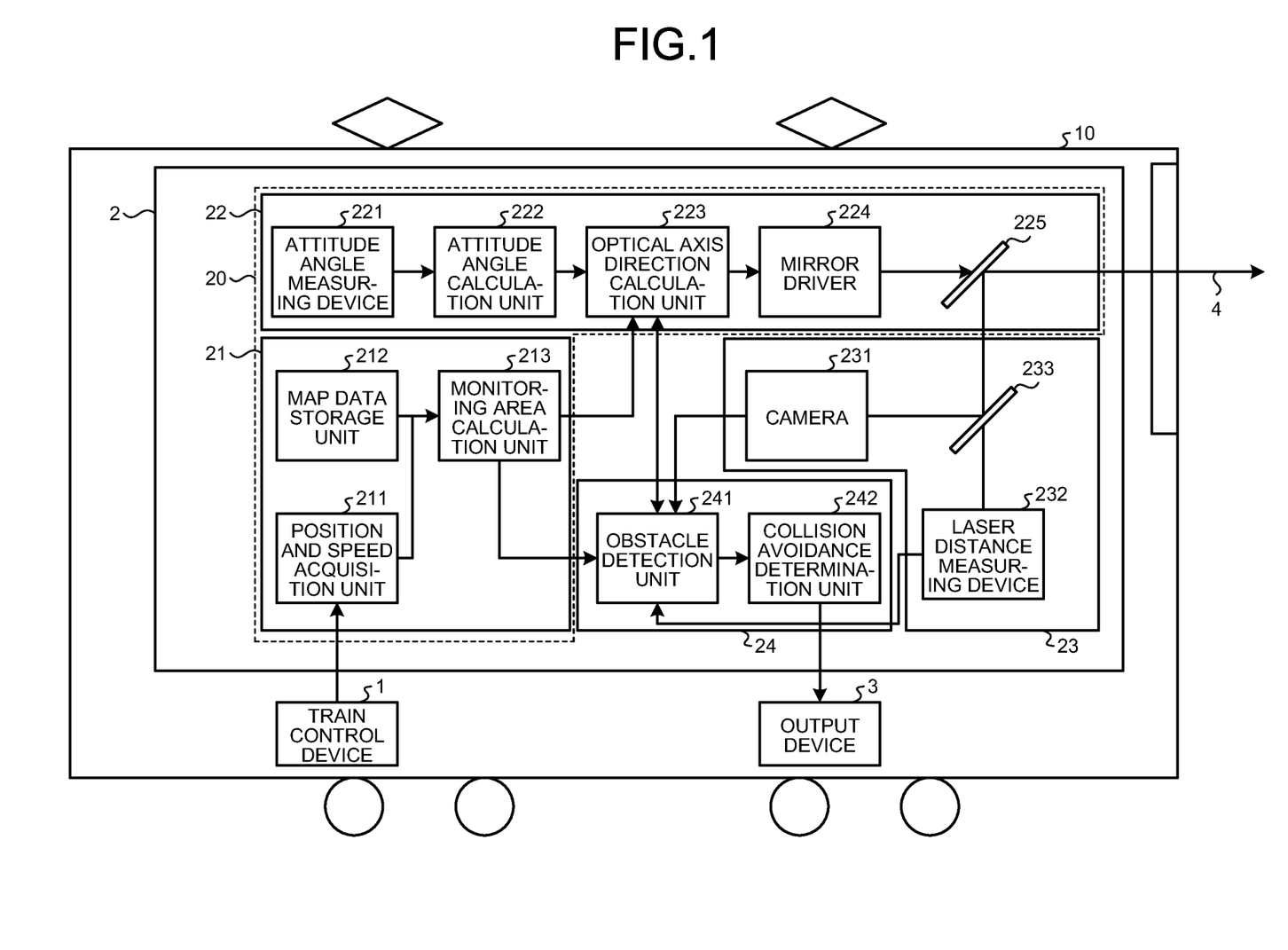
FIG. 1 is a diagram illustrating a configuration example of an obstacle detection device according to a first embodiment.

FIG. 1 is a diagram illustrating a configuration example of an obstacle detection device 2 according to a first embodiment of the present invention. The obstacle detection device 2 is installed on a train 10 together with a train control device 1 and an output device 3.

The train control device 1 detects a position of the train 10 and a speed of the train 10. The train control device 1 includes, for example, a tachogenerator and a calculation unit that calculates the speed of the train 10 and the position of the train 10 with use of a signal acquired from the tachogenerator. The obstacle detection device 2 detects an obstacle (not illustrated) on a course of the train 10. In the example of FIG. 1, a traveling direction of the train 10 is regarded as a right direction. The output device 3 is a device that informs a user such as a motorman of the train 10 of detection information on the obstacle outputted from the obstacle detection device 2 when the obstacle for which a collision avoidance action is required is detected by the obstacle detection device 2. The collision avoidance action is, for example, an action in which the motorman stops the train 10 or an action in which the motorman sounds a horn in order to avoid a collision between the train 10 and the obstacle. The output device 3 is, for example, a monitor, an indicator lamp, or the like installed on a motorman's cab of the train 10, but is not necessarily limited thereto. The output device 3 may output the detection information on the obstacle from the obstacle detection device 2 by voice or by printed matter. Note that the train 10 may be made up of a plurality of cars, or may be a single-car train made up of one car as illustrated in FIG. 1.

A configuration and an operation of the obstacle detection device 2 will be described. The obstacle detection device 2 includes a monitoring area control unit 20, a sensor unit 23, and an obstacle determination unit 24. The monitoring area control unit 20 includes a monitoring area determination unit 21 and a sensor optical axis control unit 22.

The monitoring area determination unit 21 includes a position and speed acquisition unit 211, a map data storage unit 212, and a monitoring area calculation unit 213. The position and speed acquisition unit 211 acquires the position of the train 10 and the speed of the train 10 from the train control device 1. The map data storage unit 212 stores map information indicating a position of a railway track (not illustrated) on which the train 10 travels. The map data storage unit 212 retains, that is, stores map information in the form of a database. The map information stored in the map data storage unit 212 is map information with use of which the position of the track can be specified three-dimensionally.

The monitoring area calculation unit 213 calculates a monitoring area in front of the train 10, that is, on a fore course of the train 10 to be monitored by the obstacle detection device 2, with use of the position of the train 10 and the speed of the train 10 acquired by the position and speed acquisition unit 211, and the map information stored in the map data storage unit 212. The monitoring area is an area in which the sensor unit 23 detects an obstacle on the course of the train 10, that is, an area to be an object for the sensor unit 23 to monitor presence or absence of an obstacle. Specifically, the monitoring area calculation unit 213 searches the map data storage unit 212 on the basis of the position of the train 10 and the speed of the train 10 acquired by the position and speed acquisition unit 211, and calculates the monitoring area. For example, the monitoring area calculation unit 213 specifies a position 300 meters ahead of the train 10 on the track on the basis of the position of the train 10 at the time of actually monitoring the monitoring area from a current position of the train 10 and a line shape of the track stored in the map data storage unit 212, and sets an area including the specified position as a monitoring area. The line shape of the track refers to a curvature, a gradient, or the like of the track. As described above, the monitoring area determination unit 21 determines the monitoring area to be monitored by the sensor unit 23 with use of the position of the train 10, the speed of the train 10, and the map information. Note that, when determining the monitoring area without considering a braking distance of the train 10, the monitoring area determination unit 21 does not have to use any information on the speed of the train 10. That is, in the monitoring area determination unit 21, the information on the speed of the train 10 is not essential when the monitoring area is determined. When the monitoring area is determined in consideration of the braking distance of the train 10, it is sufficient that the monitoring area determination unit 21 use the information on the speed of the train 10. Hereinafter, a case will be described where the monitoring area determination unit 21 determines the monitoring area in consideration of the braking distance of the train 10.

The sensor unit 23 includes a camera 231, a laser distance measuring device 232, and an optical element 233. The camera 231 monitors the monitoring area in front of the train 10, that is, on the course of the train 10, or rather, certainly speaking, takes an image of the monitoring area. The camera 231 outputs a camera image obtained by taking an image of the monitoring area to the obstacle determination unit 24 as a monitoring result. The laser distance measuring device 232 monitors the monitoring area in front of the train 10, that is, on the course of the train 10, or rather, certainly speaking, scans the monitoring area by a laser beam. The laser distance measuring device 232 outputs a scanning result that is a result of scanning the monitoring area by a laser beam to the obstacle determination unit 24 as a monitoring result.

The optical element 233 sets an optical axis of the camera 231 and an optical axis of the laser distance measuring device 232 to an optical axis 4 in the same direction. Specifically, as illustrated in FIG. 1, the optical element 233 splits incident light rays that are light rays incident from the outside of the train 10 via the sensor optical axis control unit 22 along the optical axis 4 into two. The optical element 233 reflects one of the split incident light toward the camera 231 and transmits the other of the split incident light toward the laser distance measuring device 232. In addition, the optical element 233 transmits a laser beam emitted from the laser distance measuring device 232 and outputs the laser beam to the sensor optical axis control unit 22. The optical element 233 is, for example, a beam splitter, a dichroic mirror, or the like, but is not necessarily limited thereto. As described above, the sensor unit 23 sets the optical axis of the camera 231 and the optical axis of the laser distance measuring device 232 to the optical axis 4 in the same direction by using the optical element 233.

The sensor optical axis control unit 22 includes an attitude angle measuring device 221, an attitude angle calculation unit 222, an optical axis direction calculation unit 223, a mirror driver 224, and a drive mirror 225. The attitude angle measuring device 221 detects an angular velocity of the train 10. The attitude angle measuring device 221 is, for example, a gyro sensor. The attitude angle calculation unit 222 calculates an attitude angle of the train 10 from a detection result of the attitude angle measuring device 221. Note that the attitude angle measuring device 221, or the attitude angle measuring device 221 and the attitude angle calculation unit 222 may be provided outside the sensor optical axis control unit 22.

The optical axis direction calculation unit 223 acquires information on the monitoring area from the monitoring area calculation unit 213 of the monitoring area determination unit 21, and acquires information on the attitude angle of the train 10 from the attitude angle calculation unit 222. The optical axis direction calculation unit 223 corrects the monitoring area determined by the monitoring area calculation unit 213 on the basis of the attitude angle of the train 10 acquired from the attitude angle calculation unit 222, and determines the monitoring area in front of the train 10, that is, on the course of the train 10 to be monitored by the obstacle detection device 2. The optical axis direction calculation unit 223 drives the drive mirror 225 via the mirror driver 224 on the basis of the determined monitoring area. The optical axis direction calculation unit 223 performs control to cause a direction of the optical axis 4 of the sensor unit 23 to be on the course of the train 10 by using the drive mirror 225. The mirror driver 224 generates a drive signal for adjusting an orientation of the drive mirror 225 based on control of the optical axis direction calculation unit 223, and outputs the drive signal to the drive mirror 225. The orientation of the drive mirror 225 is adjusted based on the control of the optical axis direction calculation unit 223 via the mirror driver 224, so as to adjust an orientation of the optical axis 4 of the sensor unit 23 appropriately.

The obstacle determination unit 24 includes an obstacle detection unit 241 and a collision avoidance determination unit 242. The obstacle detection unit 241 acquires a camera image as a monitoring result from the camera 231, and acquires a scanning result as a monitoring result from the laser distance measuring device 232. The obstacle detection unit 241 detects an obstacle on the course of the train 10 on the basis of the camera image of the camera 231 and the scanning result of the laser distance measuring device 232. That is, the obstacle detection unit 241 determines whether or not there is an obstacle on the course of the train 10 with use of the camera image and the scanning result. When determining that there is an obstacle on the course of the train 10, the obstacle detection unit 241 outputs a determination result and position information on the obstacle to the collision avoidance determination unit 242. When it is determined in the obstacle detection unit 241 that there is an obstacle on the course of the train 10, the collision avoidance determination unit 242 determines whether or not a collision avoidance action for avoiding collision with an obstacle is necessary in the train 10. When determining that the collision avoidance action is necessary in the train 10, the collision avoidance determination unit 242 outputs an instruction to urge the collision avoidance action together with information on the obstacle to the output device 3 as obstacle detection information obtained by the obstacle detection device 2. The information on the obstacle is, for example, information indicating a position of the obstacle, a size of the obstacle, a type of the obstacle, and the like, but is not necessarily limited thereto.

Figure 2:
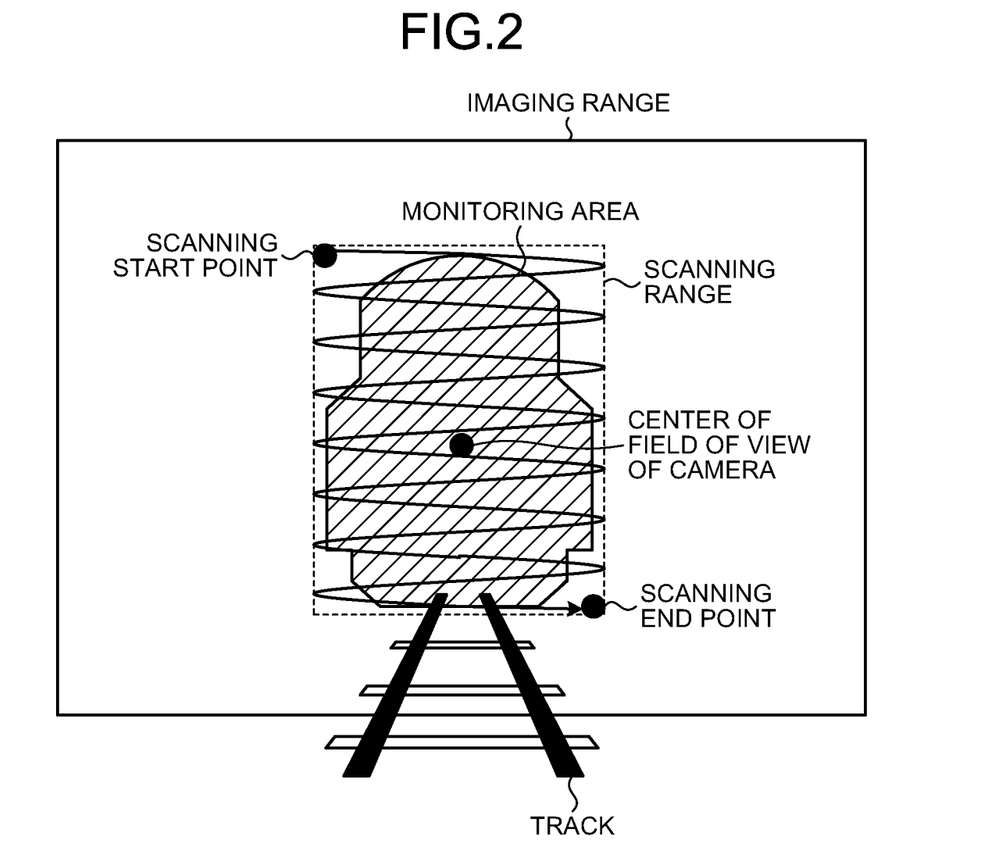
FIG. 2 is a diagram illustrating an image of a monitoring area on a course of a train for which the obstacle detection device according to the first embodiment detects an obstacle.

FIG. 2 is a diagram illustrating an image of the monitoring area on the course of the train 10 for which the obstacle detection device 2 according to the first embodiment detects an obstacle. As described above, the optical axis of the camera 231 and the optical axis of the laser distance measuring device 232 are set to the same optical axis 4 by the optical element 233. For that reason, in FIG. 2, the center of an imaging range of the camera 231, that is, the center of a field of view of the camera coincides with the center of a scanning range of the laser distance measuring device 232. The center of the field of view of the camera illustrated in FIG. 2 corresponds to a position of the optical axis 4 illustrated in FIG. 1 with respect to the monitoring area. In FIG. 2, the scanning range of the laser distance measuring device 232 includes the monitoring area. In addition, the imaging range of the camera 231 includes the scanning range of the laser distance measuring device 232. Specifically, the monitoring area is a range including a construction gauge for the train 10. The construction gauge is a range in which installation of a building or the like is prohibited, and is a range with a margin with respect to a range through which the train 10 passes when the train 10 travels on the track, in order to ensure safety of operation of the train 10.

In FIG. 2, a scanning start point of the laser distance measuring device 232 is set to the upper left of the scanning range, and a scanning end point of the laser distance measuring device 232 is set to the lower right of the scanning range, but this is just an example, and the present disclosure is not necessarily limited to this example. In the present embodiment, the sensor optical axis control unit 22 of the obstacle detection device 2 controls the direction of the optical axis 4 of the sensor unit 23 when there is a curve in the course of the train 10, when a significant shake occurs in the train 10, or in the like situation. By this control, the obstacle detection device 2 can direct the direction of the optical axis 4 of the sensor unit 23 toward the monitoring area, and can accurately detect an obstacle on the course of the train 10.

Next, a description will be given of an operation of the obstacle detection device 2 in which the obstacle determination unit 24 detects an obstacle and determines whether or not a collision avoidance action against the obstacle is necessary. In the present embodiment, a case will be described where the obstacle detection unit 241 first detects the obstacle on the camera image taken by the camera 231, and then detects the obstacle in the monitoring area on the basis of the scanning result of the laser distance measuring device 232.

Figure 3:
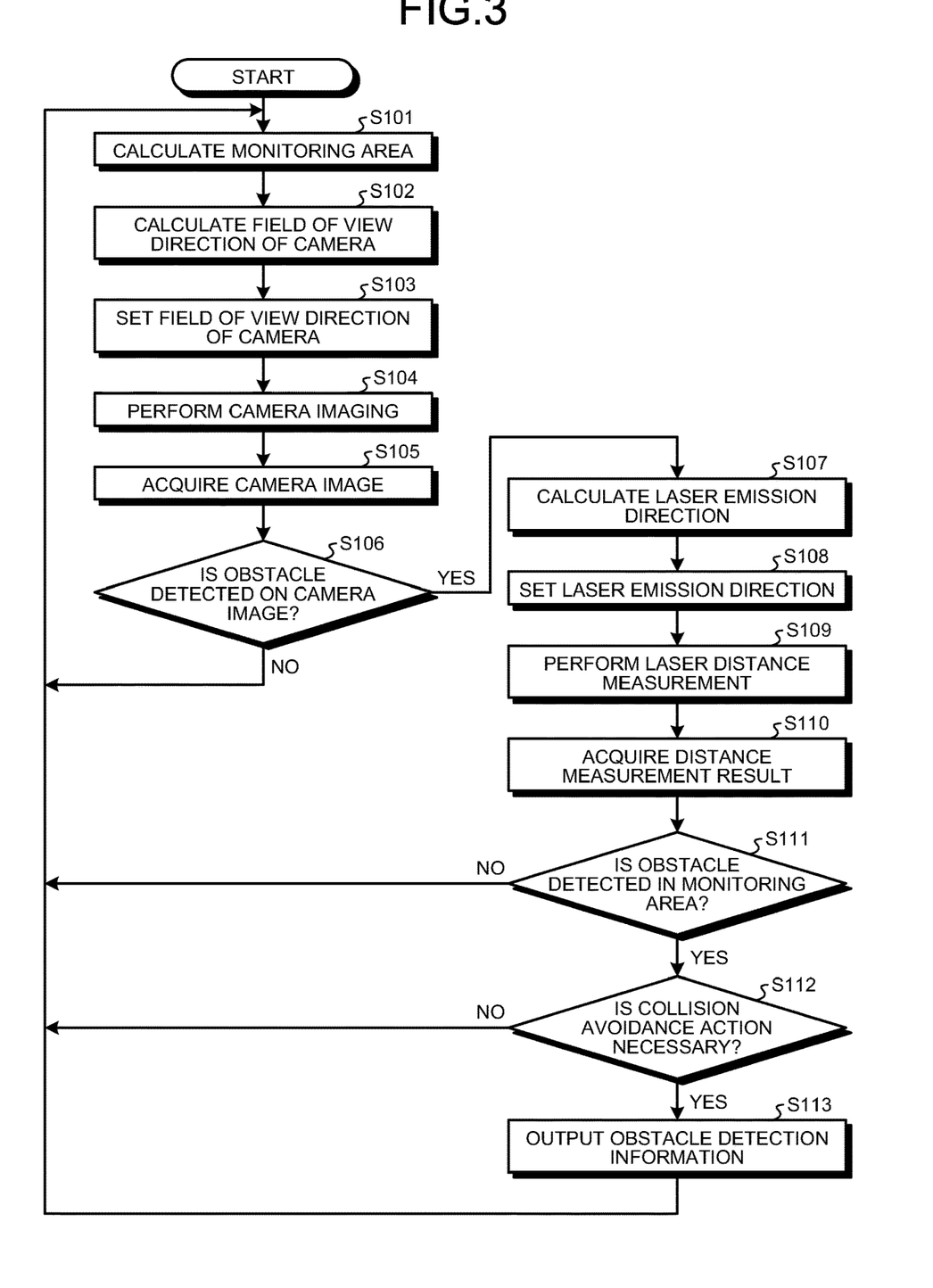
FIG. 3 is a flowchart illustrating an operation in which the obstacle detection device according to the first embodiment detects an obstacle.

FIG. 3 is a flowchart illustrating an operation in which the obstacle detection device 2 according to the first embodiment detects an obstacle. In the obstacle detection device 2, the monitoring area calculation unit 213 of the monitoring area determination unit 21 calculates a monitoring area that is on the course of the train 10 and is monitored by the sensor unit 23 (step S101). The monitoring area calculation unit 213 continuously performs an operation of calculating the monitoring area regardless of operation of the obstacle determination unit 24 described later.

The optical axis direction calculation unit 223 of the sensor optical axis control unit 22 corrects the monitoring area calculated by the monitoring area calculation unit 213 on the basis of an attitude angle of the train 10 calculated by the attitude angle calculation unit 222, and calculates a direction of a field of view of the camera 231 (step S102). Specifically, the optical axis direction calculation unit 223 calculates the direction of a field of view of the camera 231 so that the optical axis 4 corresponds to the center of the field of view of the camera illustrated in FIG. 2. The optical axis direction calculation unit 223 drives the drive mirror 225 via the mirror driver 224 to set the direction of a field of view of the camera 231 (step S103). The camera 231 takes an image of the monitoring area through the optical element 233 and the drive mirror 225 (step S104), and acquires a camera image (step S105). The camera 231 outputs the camera image to the obstacle detection unit 241 of the obstacle determination unit 24.

When no obstacle is detected on the camera image (step S106: No), the obstacle detection unit 241 notifies the optical axis direction calculation unit 223 that no obstacle has been detected on the camera image. The obstacle detection device 2 returns to step S101 and performs substantially the same operation as described above. When an obstacle is detected on the camera image (step S106: Yes), the obstacle detection unit 241 notifies the optical axis direction calculation unit 223 that the obstacle has been detected on the camera image.

The optical axis direction calculation unit 223 corrects the monitoring area calculated by the monitoring area calculation unit 213 on the basis of the attitude angle of the train 10 calculated by the attitude angle calculation unit 222, and calculates a laser emission direction of the laser distance measuring device 232 (step S107). Specifically, the optical axis direction calculation unit 223 calculates the laser emission direction so that the laser beam is emitted in a direction in which the obstacle is detected in the camera image. Note that the optical axis direction calculation unit 223 may calculate the laser emission direction so that the scanning range illustrated in FIG. 2 is scanned regardless of the direction in which the obstacle is detected in the camera image. The optical axis direction calculation unit 223 drives the drive mirror 225 via the mirror driver 224 to set the laser emission direction of the laser distance measuring device 232 (step S108). The laser distance measuring device 232 measures a distance to an object in the monitoring area through the optical element 233 and the drive mirror 225 with use of the laser, that is, performs distance measurement (step S109), and accordingly acquires a distance measurement result (step S110). The distance measurement result is a scanning result obtained by the laser distance measuring device 232 emitting a laser beam to a specific object and measuring the distance from the obstacle detection device 2 to the object. That is, the distance measurement result is also a monitoring result obtained by the laser distance measuring device 232. The laser distance measuring device 232 outputs the distance measurement result to the obstacle detection unit 241 of the obstacle determination unit 24.

When no obstacle is detected in the monitoring area on the basis of the distance measurement result (step S111: No), the obstacle detection unit 241 notifies the optical axis direction calculation unit 223 that no obstacle is detected in the monitoring area. The obstacle detection device 2 returns to step S101 and performs substantially the same operation as described above. Here, even if an object is detected on the basis of the distance measurement result, the obstacle detection unit 241 determines that no obstacle is detected in the monitoring area when the detected object is not in the monitoring area, that is, when the distance to the detected object is not the distance to the monitoring area, which is 300 meters ahead of the train 10 in the above-described example.

When the obstacle is detected in the monitoring area on the basis of the distance measurement result (step S111: Yes), the obstacle detection unit 241 outputs the camera image and the distance measurement result to the collision avoidance determination unit 242. The collision avoidance determination unit 242 determines whether or not a collision avoidance action for avoiding collision with the obstacle is necessary in the train 10 on the basis of the camera image and the distance measurement result (step S112). When determining that the obstacle detected by the obstacle detection unit 241 is, for example, a bird, a small animal, or the like on the basis of the camera image and the distance measurement result, the collision avoidance determination unit 242 determines that the collision avoidance action is unnecessary in view of nature of the bird, the small animal, or the like that is likely to escape out the monitoring area if the train 10 travels forward (step S112: No). The obstacle detection device 2 returns to step S101 and performs substantially the same operation as described above. When determining that the obstacle detected by the obstacle detection unit 241 is, for example, a fallen rock, a fallen tree, or the like on the basis of the camera image and the distance measurement result, the collision avoidance determination unit 242 determines that the collision avoidance action is necessary (step S112: Yes). The collision avoidance determination unit 242 outputs an instruction to urge the collision avoidance action together with information on the obstacle to the output device 3 as obstacle detection information obtained by the obstacle detection device 2 (step S113).

As described above, in the obstacle detection device 2, the optical axis direction calculation unit 223 controls the orientation of the drive mirror 225 via the mirror driver 224 while performing blur correction in consideration of vibration, shaking, and the like of the train 10 at the time of imaging with the camera 231. In addition, at the time of scanning with the laser distance measuring device 232, the optical axis direction calculation unit 223 controls the orientation of the drive mirror 225 via the mirror driver 224 so that the laser distance measuring device 232 can further scan the scanning range including the monitoring area as illustrated in FIG. 2 while performing blur correction in consideration of vibration, shaking, and the like of the train 10.

Figure 4:
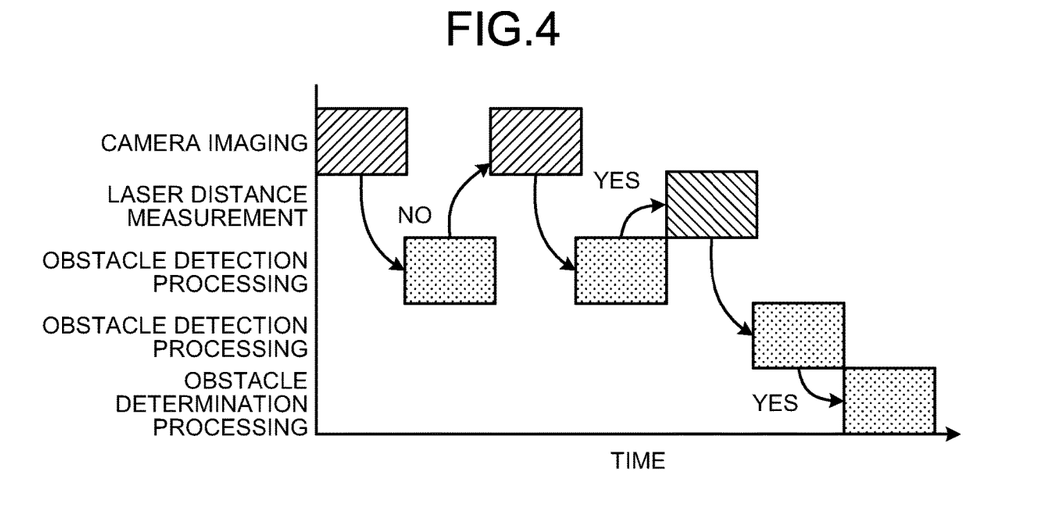
FIG. 4 is a diagram illustrating an image of the operation in which the obstacle detection device according to the first embodiment detects an obstacle.

FIG. 4 is a diagram illustrating an image of the operation in which the obstacle detection device 2 according to the first embodiment detects an obstacle. The obstacle detection device 2 first performs imaging with the camera 231, and performs obstacle detection processing using the camera image obtained accordingly. The obstacle detection device 2 performs imaging with the camera 231 until an obstacle is detected in the camera image. When an obstacle is detected in the camera image, the obstacle detection device 2 next performs distance measurement using a laser beam of the laser distance measuring device 232, and performs obstacle detection processing in the monitoring area with use of the distance measurement result obtained accordingly. When the obstacle is detected in the monitoring area from the distance measurement result, the obstacle detection device 2 determines whether or not the detected obstacle is an obstacle for which a collision avoidance action is required in the train 10.

Figure 5:
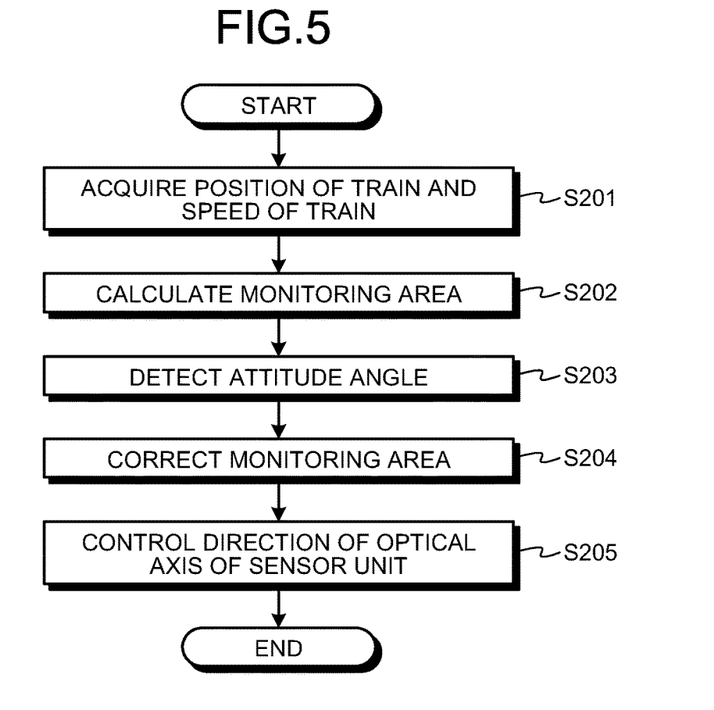
FIG. 5 is a first flowchart illustrating an operation in which the obstacle detection device according to the first embodiment controls a direction of an optical axis of a sensor unit.

Here, a description will be given of an operation in which the obstacle detection device 2 controls the direction of the optical axis 4 of the sensor unit 23. FIG. 5 is a first flowchart illustrating the operation in which the obstacle detection device 2 according to the first embodiment controls the direction of the optical axis 4 of the sensor unit 23. In the obstacle detection device 2, the position and speed acquisition unit 211 acquires the position of the train 10 and the speed of the train 10 from the train control device 1 (step S201). The monitoring area calculation unit 213 searches the map data storage unit 212 on the basis of the position of the train 10 and the speed of the train 10 acquired by the position and speed acquisition unit 211, and calculates a monitoring area (step S202). The attitude angle calculation unit 222 calculates an attitude angle of the train 10 from a detection result of the attitude angle measuring device 221 (step S203). The optical axis direction calculation unit 223 corrects the monitoring area acquired from the monitoring area calculation unit 213 on the basis of the attitude angle of the train 10 acquired from the attitude angle calculation unit 222 (step S204). The optical axis direction calculation unit 223 drives the drive mirror 225 via the mirror driver 224 on the basis of the corrected monitoring area, and performs control to cause the direction of the optical axis 4 of the sensor unit 23 to be on the course of the train 10 with use of the drive mirror 225 (step S205).

Note that, in the present embodiment, the optical axis direction calculation unit 223 corrects the monitoring area calculated by the monitoring area calculation unit 213 on the basis of the attitude angle of the train 10 calculated by the attitude angle calculation unit 222, but the present disclosure is not limited to this example. For example, the monitoring area calculation unit 213 may be deleted in the obstacle detection device 2, and the optical axis direction calculation unit 223 may calculate the monitoring area on the basis of the position of the train 10, the speed of the train 10, the map information stored in the map data storage unit 212, and the attitude angle of the train 10. When viewed as a unit of the monitoring area control unit 20, the operation in the case where the monitoring area calculation unit 213 has been deleted is similar to the operation in the case where the monitoring area calculation unit 213 is present.

Figure 6:
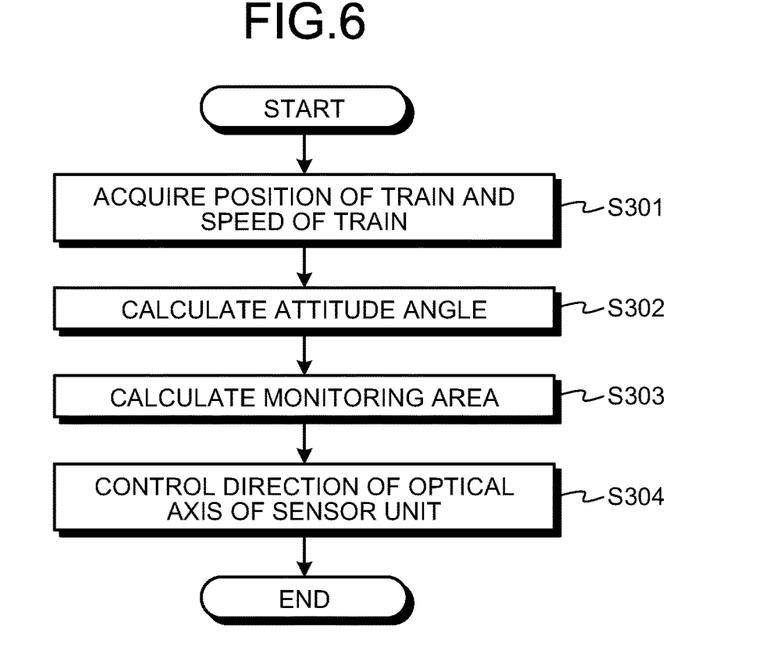
FIG. 6 is a second flowchart illustrating the operation in which the obstacle detection device according to the first embodiment controls the direction of the optical axis of the sensor unit.

FIG. 6 is a second flowchart illustrating the operation in which the obstacle detection device 2 according to the first embodiment controls the direction of the optical axis 4 of the sensor unit 23. In the obstacle detection device 2, the monitoring area control unit 20 acquires the position of the train 10 and the speed of the train 10 from the train control device 1 (step S301). The monitoring area control unit 20 calculates an attitude angle of the train 10 from a detection result of the attitude angle measuring device 221 (step S302). The monitoring area control unit 20 calculates the monitoring area to be monitored by the sensor unit 23 on the basis of the position of the train 10, the speed of the train 10, the map information stored in the map data storage unit 212, and the attitude angle of the train 10 (step S303). The monitoring area control unit 20 drives the drive mirror 225 via the mirror driver 224 on the basis of the calculated monitoring area, and performs control to cause the direction of the optical axis 4 of the sensor unit 23 to be on the course of the train 10 with use of the drive mirror 225 (step S304).

Next, a hardware configuration of the obstacle detection device 2 will be described. In the obstacle detection device 2, the map data storage unit 212 is a memory. The attitude angle measuring device 221, the camera 231, and the laser distance measuring device 232 are sensors. The drive mirror 225 and the optical element 233 are elements including a mirror, a lens, a prism, and the like. In the obstacle detection device 2, the other components are implemented by a processing circuit. The processing circuit may be a processor and a memory that are set to execute a program stored in the memory, or may be dedicated hardware therefor.

Figure 7:
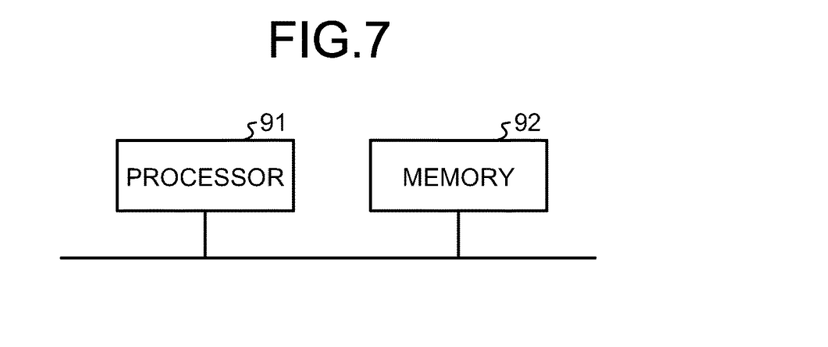
FIG. 7 is a diagram illustrating an example of a case where a processing circuit included in the obstacle detection device according to the first embodiment is configured with a processor and a memory.

FIG. 7 is a diagram illustrating an example of a case where the processing circuit included in the obstacle detection device 2 according to the first embodiment is configured with a processor and a memory. When the processing circuit is composed of a processor 91 and a memory 92, functions of the processing circuit of the obstacle detection device 2 are implemented by software, firmware, or a combination of software and firmware. The software or firmware is described as a program and stored in the memory 92. In the processing circuit, the processor 91 reads and executes programs stored in the memory 92 to implement the functions. That is, the processing circuit includes the memory 92 for storing the programs based on which processing of the obstacle detection device 2 is resultantly executed. In addition, it can also be said that these programs cause a computer to execute a procedure or a method of the obstacle detection device 2.

Here, the processor 91 may be a central processing unit (CPU), a processing device, a calculation device, a microprocessor, a microcomputer, a digital signal processor (DSP), or the like. In addition, the memory 92 corresponds to, for example, a nonvolatile or volatile semiconductor memory such as a random access memory (RAM), a read only memory (ROM), a flash memory, an erasable programmable ROM (EPROM), or an electrically EPROM (EEPROM) (registered trademark), a magnetic disk, a flexible disk, an optical disk, a compact disc, a mini disc, a digital versatile disc (DVD), or the like.

Figure 8:
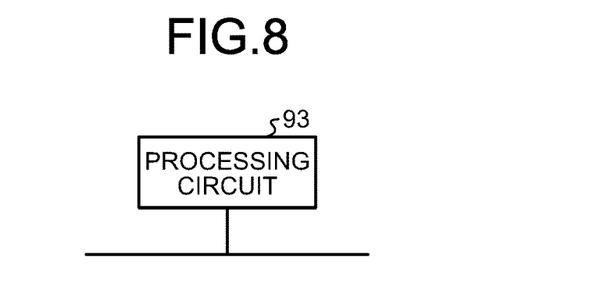
FIG. 8 is a diagram illustrating an example of a case where the processing circuit included in the obstacle detection device according to the first embodiment is configured with dedicated hardware.

FIG. 8 is a diagram illustrating an example of a case where the processing circuit included in the obstacle detection device 2 according to the first embodiment is configured by dedicated hardware. When the processing circuit is configured by dedicated hardware, the processing circuit 93 illustrated in FIG. 8 corresponds to, for example, a single circuit, a composite circuit, a programmed processor, a parallel-programmed processor, an application specific integrated circuit (ASIC), a field programmable gate array (FPGA), or a combination thereof. The functions of the obstacle detection device 2 may be implemented by the processing circuit 93 for each function, or the functions may be collectively implemented by the processing circuit 93.

Note that, regarding the functions of the obstacle detection device 2, part of the functions may be implemented by dedicated hardware and part of the functions may be implemented by software or firmware. In such a manner, the processing circuit can implement the above-described functions by dedicated hardware, software, firmware, or a combination thereof.

As described above, according to the present embodiment, in the obstacle detection device 2, the sensor unit 23 sets the optical axis of the camera 231 and the optical axis of the laser distance measuring device 232 to coincide with the optical axis 4 in the same direction, using the optical element 233. The monitoring area calculation unit 213 calculates the monitoring area to be monitored by the sensor unit 23 with use of the position of the train 10, the speed of the train 10, and the map information of the track stored in the map data storage unit 212. The optical axis direction calculation unit 223 corrects the monitoring area on the basis of the attitude angle of the train 10, drives the drive mirror 225 via the mirror driver 224, and controls the direction of the optical axis 4 of the sensor unit 23. That is, the monitoring area control unit 20 calculates the monitoring area on the basis of the position of the train 10, the speed of the train 10, the map information of the track stored in the map data storage unit 212, and the attitude angle of the train 10, drives the drive mirror 225 via the mirror driver 224, and controls the direction of the optical axis 4 of the sensor unit 23. As a result, when detecting an obstacle using the camera 231 and the laser distance measuring device 232, the obstacle detection device 2 can perform control such that the direction of the optical axis 4 coincides with a direction to the monitoring area, by correcting the direction of the optical axis 4 of the camera 231 and the laser distance measuring device 232 in accordance with shaking, vibration, or the like of the train 10. As a result, the obstacle detection device 2 can improve detection accuracy of an obstacle on the course of the train 10 on which the obstacle detection device 2 is installed.

In addition, in the present embodiment, the obstacle determination unit 24 in the obstacle detection device 2 determines the presence or absence of an obstacle on the basis of the camera image that is the monitoring result obtained by the camera 231, and when determining that there is an obstacle, the unit 24 further determines the presence or absence of the obstacle on the basis of the distance measurement result that is the monitoring result obtained by the laser distance measuring device 232. As a result, even in a situation where estimation of the distance to the obstacle is difficult only with the camera image of the camera 231, the obstacle detection device 2 can accurately determine whether or not there is an obstacle in the monitoring area by measuring the distance to the obstacle with the laser beam of the laser distance measuring device 232.

In the present embodiment, a case has been described where the obstacle detection device 2 is installed on the train 10, but the present disclosure is not limited to this example. The obstacle detection device 2 can also be installed on, for example, a mobile body that is other than the train 10 and travels on a prescribed route, and can detect an obstacle on a course of the mobile body.

Second Embodiment

In the first embodiment, the obstacle detection device 2 first detects an obstacle using a camera image, and then detects the obstacle using a distance measurement result. In a second embodiment, a description will be given of an operation in which the obstacle detection device 2 first detects an obstacle using a monitoring result of the laser distance measuring device 232 and then detects the obstacle using a camera image.

A configuration of the obstacle detection device 2 in the second embodiment is similar to the configuration of the obstacle detection device 2 in the first embodiment illustrated in FIG. 1.

Figure 9:
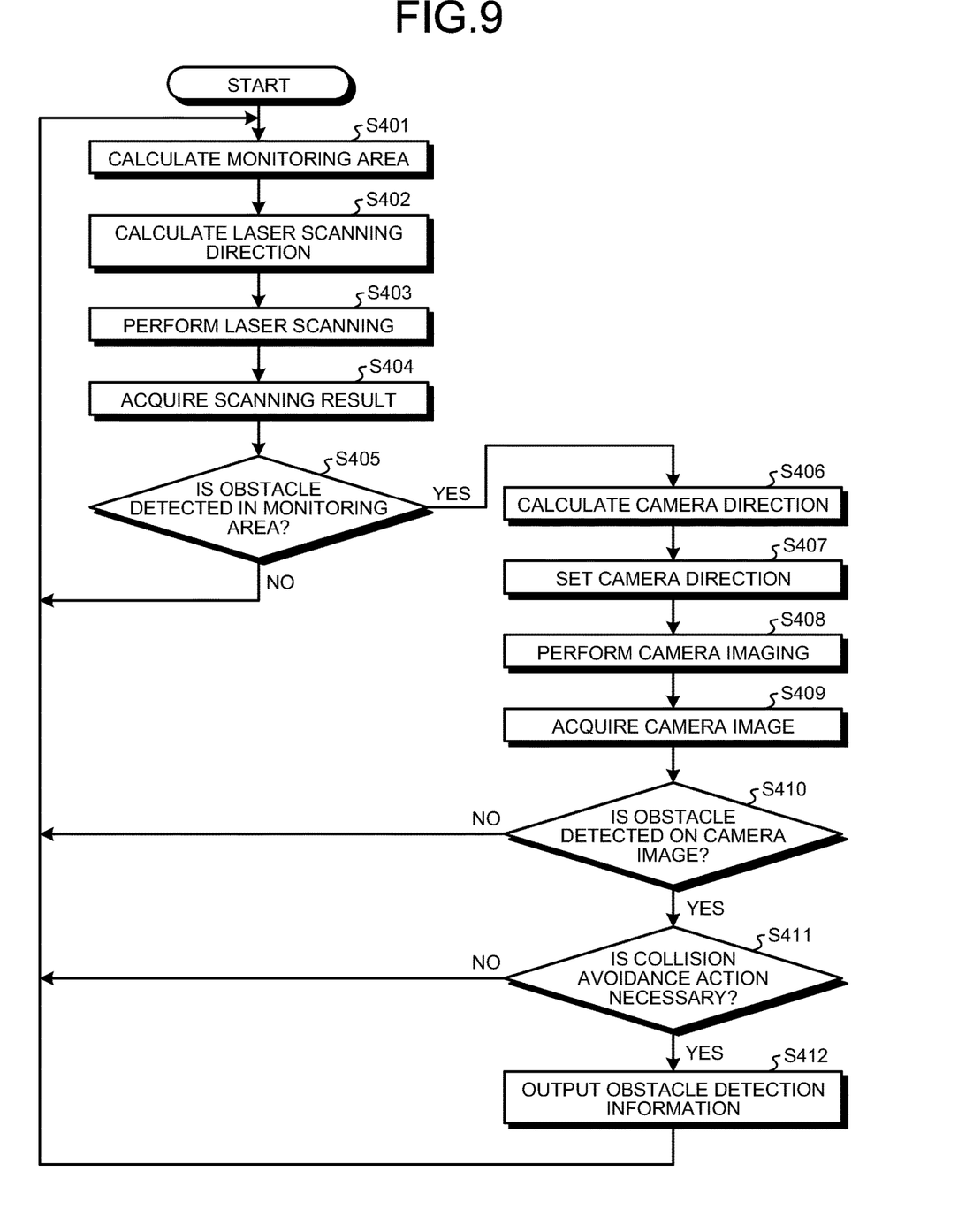
FIG. 9 is a flowchart illustrating an operation in which the obstacle detection device according to a second embodiment detects an obstacle.

FIG. 9 is a flowchart illustrating an operation in which the obstacle detection device 2 according to the second embodiment detects an obstacle. In the obstacle detection device 2, the monitoring area calculation unit 213 of the monitoring area determination unit 21 calculates a monitoring area to be monitored by the sensor unit 23, which is on the course of the train 10 (step S401). The monitoring area calculation unit 213 continuously performs an operation of calculating the monitoring area regardless of an operation of the obstacle determination unit 24 described later.

The optical axis direction calculation unit 223 of the sensor optical axis control unit 22 corrects the monitoring area calculated by the monitoring area calculation unit 213 on the basis of the attitude angle of the train 10 calculated by the attitude angle calculation unit 222, and calculates a scanning direction of the laser distance measuring device 232 (step S402). Specifically, the optical axis direction calculation unit 223 calculates the scanning direction of the laser distance measuring device 232 so that the monitoring area illustrated in FIG. 2 is included in the scanning range. The laser distance measuring device 232 emits a laser beam through the optical element 233 and the drive mirror 225, scans the monitoring area using the laser beam (step S403), and acquires a scanning result (step S404). At this time, the optical axis direction calculation unit 223 drives the drive mirror 225 via the mirror driver 224 to control the laser emission direction of the laser distance measuring device 232. The laser distance measuring device 232 outputs the scanning result to the obstacle detection unit 241 of the obstacle determination unit 24.

When no obstacle is detected in the monitoring area on the basis of the scanning result (step S405: No), the obstacle detection unit 241 notifies the optical axis direction calculation unit 223 that no obstacle has been detected in the monitoring area. The obstacle detection device 2 returns to step S401 and performs substantially the same operation as described above. When an obstacle is detected in the monitoring area on the basis of the scanning result (step S405: Yes), the obstacle detection unit 241 notifies the optical axis direction calculation unit 223 that the obstacle has been detected in the monitoring area.

The optical axis direction calculation unit 223 calculates a direction in which the camera 231 performs imaging (step S406). Specifically, the optical axis direction calculation unit 223 calculates the direction of the camera 231 so that the camera 231 faces in a direction in which the obstacle has been detected in the scanning result of the laser distance measuring device 232. The optical axis direction calculation unit 223 drives the drive mirror 225 via the mirror driver 224 to set the direction of the camera 231 appropriately (step S407). The camera 231 takes an image of the monitoring area through the optical element 233 and the drive mirror 225 (step S408), and acquires a camera image (step S409). The camera 231 outputs the camera image to the obstacle detection unit 241 of the obstacle determination unit 24.

When no obstacle is detected on the camera image (step S410: No), the obstacle detection unit 241 notifies the optical axis direction calculation unit 223 that no obstacle has been detected on the camera image. The obstacle detection device 2 returns to step S401 and performs substantially the same operation as described above. When the obstacle is detected on the camera image (step S410: Yes), the obstacle detection unit 241 outputs the camera image and the scanning result to the collision avoidance determination unit 242. The collision avoidance determination unit 242 determines whether or not a collision avoidance action for avoiding collision with the obstacle is necessary in the train 10 on the basis of the camera image and the scanning result (step S411). When determining that the obstacle detected by the obstacle detection unit 241 is, for example, a bird, a small animal, or the like on the basis of the camera image and the scanning result, the collision avoidance determination unit 242 determines that the collision avoidance action is unnecessary in view of nature of the bird, the small animal, or the like that is likely to escape from the monitoring area as the train 10 travels forward (step S411: No). The obstacle detection device 2 returns to step S401 and performs substantially the same operation as described above. When determining that the obstacle detected by the obstacle detection unit 241 is, for example, a fallen rock, a fallen tree, or the like on the basis of the camera image and the scanning result, the collision avoidance determination unit 242 determines that the collision avoidance action is necessary (step S411: Yes). The collision avoidance determination unit 242 outputs an instruction to urge the collision avoidance action together with information on the obstacle to the output device 3 as obstacle detection information obtained by the obstacle detection device 2 (step S412).

Figure 10:
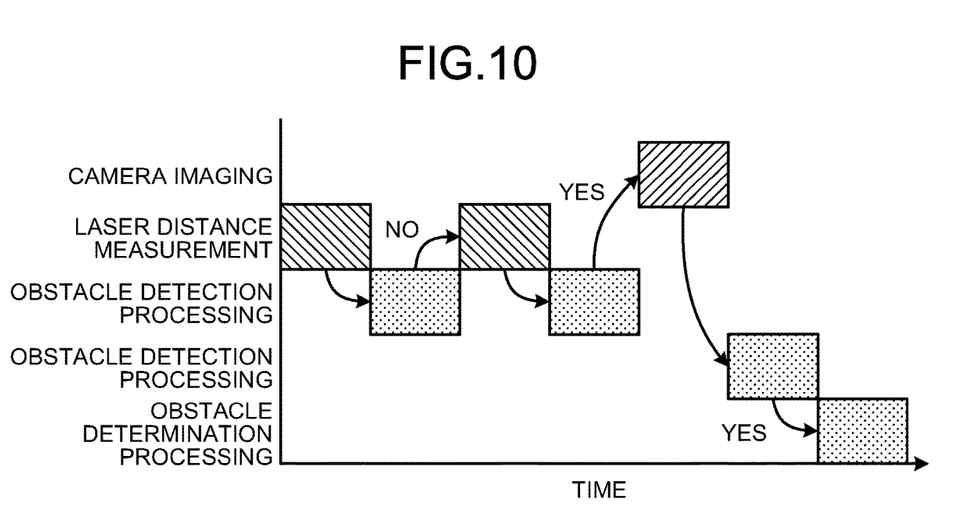
FIG. 10 is a diagram illustrating an image of the operation in which the obstacle detection device according to the second embodiment detects an obstacle.

FIG. 10 is a diagram illustrating an image of the operation in which the obstacle detection device 2 according to the second embodiment detects an obstacle. The obstacle detection device 2 first performs laser scanning with the laser distance measuring device 232, and performs obstacle detection processing in the monitoring area with use of the scanning result obtained accordingly. The obstacle detection device 2 performs laser scanning with the laser distance measuring device 232 until an obstacle is detected in the scanning result. When an obstacle is detected in the scanning result, the obstacle detection device 2 next performs imaging with the camera 231, and performs obstacle detection processing with use of the obtained camera image. When an obstacle is detected in the camera image, the obstacle detection device 2 determines whether or not the detected obstacle is an obstacle for which a collision avoidance action is required in the train 10.

As described above, similarly to the first embodiment, the obstacle detection device 2 can improve the detection accuracy of an obstacle on the course of the train 10 on which the obstacle detection device 2 is installed.

In the present embodiment, the obstacle determination unit 24 in the obstacle detection device 2 determines the presence or absence of an obstacle on the basis of the scanning result that is the monitoring result of the laser distance measuring device 232, and when determining that there is an obstacle, the unit 24 further determines the presence or absence of the obstacle on the basis of the camera image that is the monitoring result of the camera 231. As a result, even in a situation where the resolution of the position in the horizontal direction is significantly low or a possible error is significantly large only with the laser, the obstacle detection device 2 can accurately determine whether or not there is an obstacle in the monitoring area by virtue of use of the camera image of the camera 231. In addition, in bad weather such as rain or fog, and in a situation with poor visibility in nighttime or the like, the laser distance measuring device 232 is more effective than the camera 231 because the laser distance measuring device 232 can detect an obstacle even when obstacle detection by the camera 231 is difficult.

Third Embodiment

In the first and second embodiments, the obstacle detection device 2 is configured to detect an obstacle separately for each of the camera image of the camera 231 and the monitoring result by the laser distance measuring device 232. In a third embodiment, the obstacle detection device 2 detects an obstacle with use of both the camera image of the camera 231 and the scanning result of the laser distance measuring device 232.

A configuration of the obstacle detection device 2 in the third embodiment is similar to the configuration of the obstacle detection device 2 in the first embodiment illustrated in FIG. 1.

Figure 11:
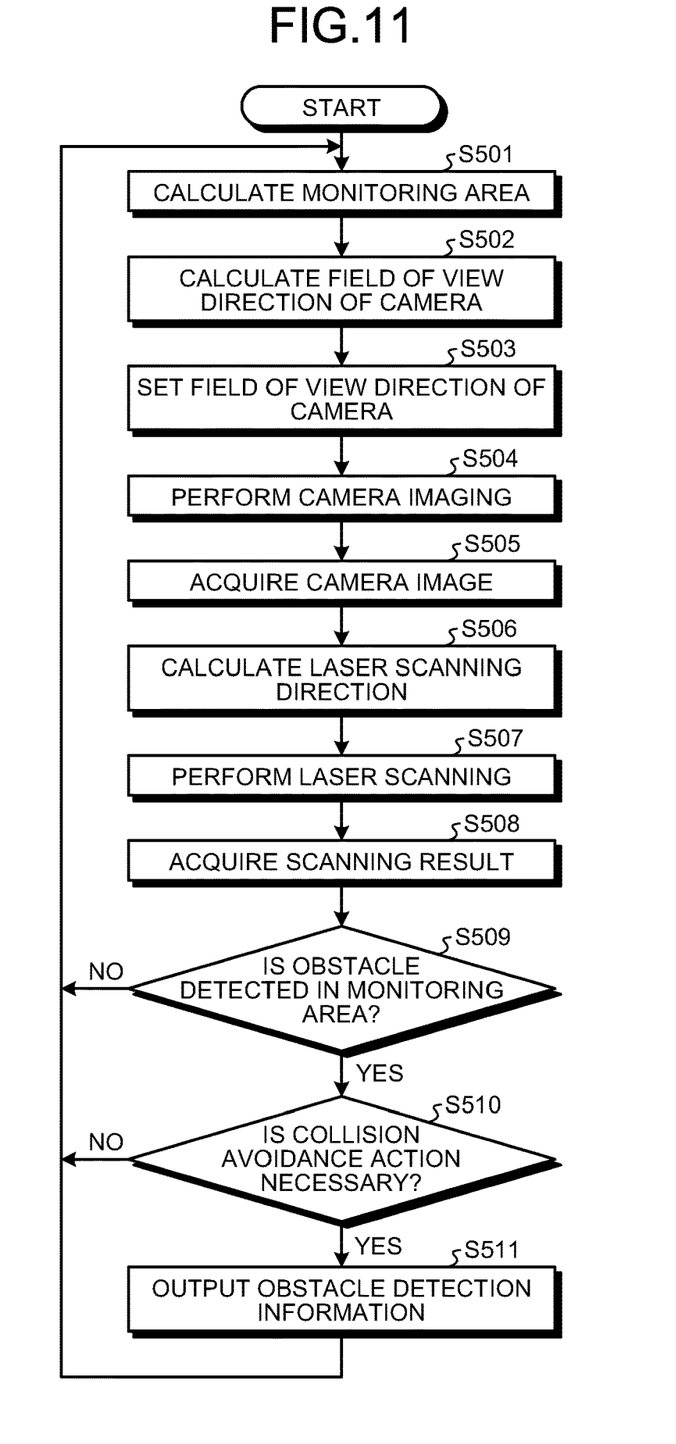
FIG. 11 is a flowchart illustrating an operation in which the obstacle detection device according to a third embodiment detects an obstacle.

FIG. 11 is a flowchart illustrating an operation in which the obstacle detection device 2 according to the third embodiment detects an obstacle. In the obstacle detection device 2, the monitoring area calculation unit 213 of the monitoring area determination unit 21 calculates a monitoring area that is on the course of the train 10 and is monitored by the sensor unit 23 (step S501). The monitoring area calculation unit 213 continuously performs an operation of calculating the monitoring area regardless of the operation of the obstacle determination unit 24 described later.

The optical axis direction calculation unit 223 of the sensor optical axis control unit 22 corrects the monitoring area calculated by the monitoring area calculation unit 213 on the basis of an attitude angle of the train 10 calculated by the attitude angle calculation unit 222, and calculates a field of view direction of the camera 231 (step S502). Specifically, the optical axis direction calculation unit 223 calculates the field of view direction of the camera 231 so that the optical axis 4 is at the center of the field of view of the camera illustrated in FIG. 2. The optical axis direction calculation unit 223 drives the drive mirror 225 via the mirror driver 224 to set the field of view direction of the camera 231 appropriately (step S503). The camera 231 takes an image of the monitoring area through the optical element 233 and the drive mirror 225 (step S504), and acquires a camera image (step S505). The camera 231 outputs the camera image to the obstacle detection unit 241 of the obstacle determination unit 24.

The optical axis direction calculation unit 223 of the sensor optical axis control unit 22 corrects the monitoring area calculated by the monitoring area calculation unit 213 on the basis of the attitude angle of the train 10 calculated by the attitude angle calculation unit 222, and calculates a scanning direction of the laser distance measuring device 232 (step S506). Specifically, the optical axis direction calculation unit 223 calculates the scanning direction of the laser distance measuring device 232 so that the monitoring area illustrated in FIG. 2 is included in the scanning range. The laser distance measuring device 232 emits a laser beam through the optical element 233 and the drive mirror 225, scans the monitoring area using the laser beam (step S507), and acquires a scanning result (step S508). At this time, the optical axis direction calculation unit 223 drives the drive mirror 225 via the mirror driver 224 to control the laser emission direction of the laser distance measuring device 232. The laser distance measuring device 232 outputs the scanning result to the obstacle detection unit 241 of the obstacle determination unit 24.

When no obstacle is detected in the monitoring area on the basis of the camera image and the scanning result (step S509: No), the obstacle detection unit 241 notifies the optical axis direction calculation unit 223 that no obstacle has been detected in the monitoring area. The obstacle detection device 2 returns to step S501 and performs substantially the same operation as described above. When an obstacle is detected in the monitoring area on the basis of the camera image and the scanning result (step S509: Yes), the obstacle detection unit 241 outputs the camera image and the scanning result to the collision avoidance determination unit 242.

The collision avoidance determination unit 242 determines whether or not a collision avoidance action for avoiding collision with the obstacle is necessary in the train 10 on the basis of the camera image and the scanning result (step S510). When determining that the obstacle detected by the obstacle detection unit 241 is, for example, a bird, a small animal, or the like on the basis of the camera image and the scanning result, the collision avoidance determination unit 242 determines that the collision avoidance action is unnecessary in view of nature of the bird, the small animal, or the like that is likely to escape from the monitoring area as the train 10 travels forward (step S510: No). The obstacle detection device 2 returns to step S501 and performs substantially the same operation as described above. When determining that the obstacle detected by the obstacle detection unit 241 is, for example, a fallen rock, a fallen tree, or the like on the basis of the camera image and the scanning result, the collision avoidance determination unit 242 determines that the collision avoidance action is necessary (step S510: Yes). The collision avoidance determination unit 242 outputs an instruction to urge the collision avoidance action together with information on the obstacle to the output device 3 as obstacle detection information obtained by the obstacle detection device 2 (step S511).

Figure 12:
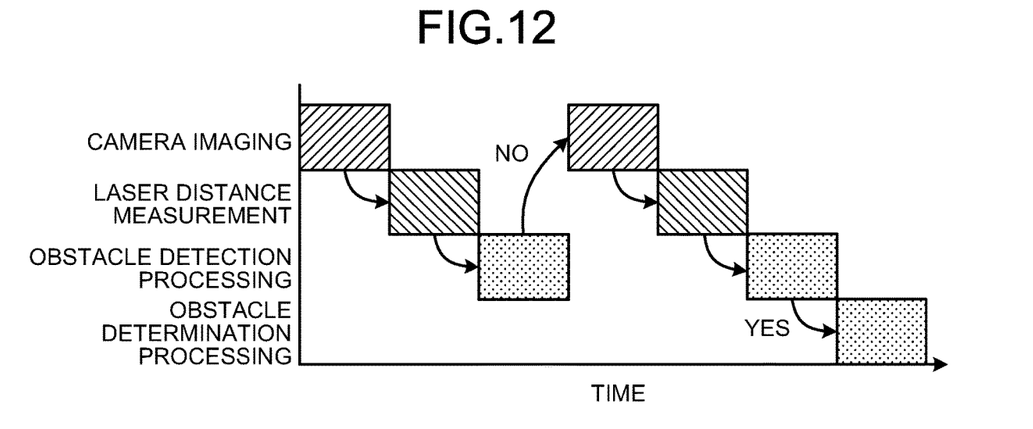
FIG. 12 is a diagram illustrating an image of the operation in which the obstacle detection device according to the third embodiment detects an obstacle.

FIG. 12 is a diagram illustrating an image of the operation in which the obstacle detection device 2 according to the third embodiment detects an obstacle. The obstacle detection device 2 performs imaging with the camera 231 to obtain a camera image, and performs laser scanning with the laser distance measuring device 232 to obtain a scanning result. When an obstacle is detected in the camera image and the scanning result, the obstacle detection device 2 determines whether or not the detected obstacle is an obstacle for which a collision avoidance action is required in the train 10.

In the present embodiment, the obstacle detection device 2 first performs imaging with the camera 231 to acquire a camera image, and then acquires a scanning result by scanning with the laser distance measuring device 232, but the present disclosure is not necessarily limited to this example. The obstacle detection device 2 may first acquire the scanning result by scanning with the laser distance measuring device 232, and then acquire the camera image by performing imaging with the camera 231.

As described above, similarly to the first and second embodiments, the obstacle detection device 2 can improve the detection accuracy of an obstacle on the course of the train 10 on which the obstacle detection device 2 is installed.

In the present embodiment, the sensor optical axis control unit 22 in the obstacle detection device 2 switches control of the drive mirror 225 so that the imaging with the camera 231 and the scanning with the laser distance measuring device 232 are alternately performed in a time-divisional manner. The obstacle determination unit 24 determines the presence or absence of an obstacle on the basis of the camera image that is the monitoring result of the camera 231 and the scanning result that is the monitoring result of the laser distance measuring device 232. As a result, the obstacle detection device 2 can more efficiently determine the presence or absence of an obstacle, and can accurately determine whether or not there is an obstacle in the monitoring area. In addition, the obstacle detection device 2 can improve real-time property in detection of an obstacle as compared with the first and second embodiments.

The configurations described in the above embodiments show just examples of contents of the present invention, each of which can be combined with other publicly known techniques and partially omitted and/or modified without departing from the scope of the present invention.

REFERENCE SIGNS LIST 1 train control device; 2 obstacle detection device; 3 output device; 4 optical axis; 10 train; 20 monitoring area control unit; 21 monitoring area determination unit; 22 sensor optical axis control unit; 23 sensor unit; 24 obstacle determination unit; 211 position and speed acquisition unit; 212 map data storage unit; 213 monitoring area calculation unit; 221 attitude angle measuring device; 222 attitude angle calculation unit; 223 optical axis direction calculation unit; 224 mirror driver; 225 drive mirror; 231 camera; 232 laser distance measuring device; 233 optical element; 241 obstacle detection unit; 242 collision avoidance determination unit.

The invention claimed is:

1. An obstacle detection device to be installed on a train, the obstacle detection device comprising:
a sensor unit including a camera, a laser distance measuring device, and an optical element, by which an optical axis of the camera and an optical axis of the laser distance measuring device are set to an optical axis in the same direction with use of the optical element;
a monitoring area control unit to calculate a monitoring area to be monitored by the sensor unit, with use of a position of the train, map information stored in a map data storage unit and indicating a position of a track on which the train travels, and an attitude angle of the train, and perform control to cause a direction of the optical axis of the sensor unit to be on a course of the train with use of a drive mirror; and
an obstacle determination unit to detect an obstacle on the course of the train and determine whether or not a collision avoidance action for avoiding collision with the obstacle is necessary in the train, on the basis of a monitoring result of the camera and a monitoring result of the laser distance measuring device,
wherein the optical element splits incident light incident from outside of the train into two reflects one split incident light toward the camera, and transmits the other split incident light toward the laser distance measuring device, thereby setting the optical axis of the camera and the optical axis of the laser distance measuring device to the same optical axis in the same direction.

2. The obstacle detection device according to claim 1, wherein
the obstacle determination unit determines presence or absence of the obstacle on the basis of the monitoring result of the camera, and when determining that the obstacle is present, further determines the presence or absence of the obstacle on the basis of the monitoring result by the laser distance measuring device.

3. The obstacle detection device according to claim 1, wherein
the obstacle determination unit determines presence or absence of the obstacle on the basis of the monitoring result of the laser distance measuring device, and when determining that the obstacle is present, further determines the presence or absence of the obstacle on the basis of the monitoring result of the camera.

4. The obstacle detection device according to claim 1, wherein
the monitoring area control unit switches control of the drive mirror to cause imaging of the camera and scanning of the laser distance measuring device to be alternately performed in a time-divisional manner, and
the obstacle determination unit determines presence or absence of the obstacle on the basis of the monitoring result of the camera and the monitoring result of the laser distance measuring device.

5. The obstacle detection device according claim 1, wherein
the obstacle determination unit determines whether or not the collision avoidance action is necessary when determining that the obstacle is present on the basis of the monitoring result of the camera and the monitoring result of the laser distance measuring device, and outputs detection information on the obstacle when determining that the collision avoidance action is necessary.

6. The obstacle detection device according to claim 1, wherein
the monitoring area control unit controls an orientation of the drive mirror while performing blur correction at time of imaging by the camera, and controls the orientation of the drive mirror to enable a scanning range including the monitoring area to be scanned while performing blur correction at time of scanning by the laser distance measuring device.

7. The obstacle detection device according to claim 1, wherein
the monitoring area control unit includes:
a monitoring area determination unit to determine the monitoring area to be monitored by the sensor unit with used of the position of the train, a speed of the train, and the map information; and a sensor optical axis control unit to correct the monitoring area determined by the monitoring area determination unit on the basis of the attitude angle of the train and perform control to cause the direction of the optical axis of the sensor unit to be on the course of the train with use of the drive mirror.

8. The obstacle detection device according to claim 1, wherein the optical element comprises a beam splitter.

9. The obstacle detection device according to claim 1, wherein the optical element comprises a dichroic mirror.

10. The obstacle detection method according to claim 1, wherein the optical element transmits a laser beam emitted from the laser distance measuring device and outputs the laser beam to the drive mirror.

11. An obstacle detection method for an obstacle detection device to be installed on a train, the obstacle detection device including a sensor unit including a camera, a laser distance measuring device, and an optical element, by which an optical axis of the camera and an optical axis of the laser distance measuring device are set to an optical axis in the same direction with use of the optical element, the obstacle detection method comprising:
 a first step, by a monitoring area control unit, of calculating a monitoring area to be monitored by the sensor unit, with use of a position of the train, map information stored in a map data storage unit and indicating a position of a track on which the train travels, and an attitude angle of the train and performing control to cause a direction of the optical axis of the sensor unit to be on a course of the train with use of a drive mirror; and
 a second step, by an obstacle determination unit, of detecting an obstacle on the course of the train and determining whether or not a collision avoidance action for avoiding collision with the obstacle is necessary in the train, on the basis of a monitoring result of the camera and a monitoring result of the laser distance measuring device,
 wherein the optical element splits incident light incident from outside of the train into two, reflects one split incident light toward the camera, and transmits the other split incident light toward the laser distance measuring device, thereby setting the optical axis of the camera and the optical axis of the laser distance measuring device to the same optical axis in the same direction.

12. The obstacle detection method according to claim 11, wherein
 in the second step, the obstacle determination unit determines presence or absence of the obstacle on the basis of the monitoring result of the camera, and when determining that the obstacle is present, further determines the presence or absence of the obstacle on the basis of the monitoring result of the laser distance measuring device.

13. The obstacle detection method according to claim 11, wherein
 in the second step, the obstacle determination unit determines presence or absence of the obstacle on the basis of the monitoring result of the laser distance measuring device, and when determining that the obstacle is present, further determines the presence or absence of the obstacle on the basis of the monitoring result of the camera.

14. The obstacle detection method according to claim 11, wherein
 in the first step, the monitoring area control unit switches control of the drive mirror to cause imaging by the camera and scanning by the laser distance measuring device to be alternately performed in a time-divisional manner, and
 in the second step, the obstacle determination unit determines presence or absence of the obstacle on the basis of the monitoring result of the camera and the monitoring result of the laser distance measuring device.

15. The obstacle detection method according to claim 11, wherein
 in the second step, the obstacle determination unit determines whether or not the collision avoidance action is necessary when determining that the obstacle is present on the basis of the monitoring result of the camera and the monitoring result of the laser distance measuring device, and outputs detection information on the obstacle when determining that the collision avoidance action is necessary.

16. The obstacle detection method according to claim 11, wherein
 in the first step, the monitoring area control unit controls an orientation of the drive mirror while performing blur correction at time of imaging by the camera, and controls the orientation of the drive mirror to enable a scanning range including the monitoring area to be scanned while performing blur correction at time of scanning by the laser distance measuring device.

17. The obstacle detection method according to claim 11, wherein
 the monitoring area control unit includes a monitoring area determination unit and a sensor optical axis control unit, and
 the first step includes:
 a third step, by the monitoring area determination unit, of determining the monitoring area to be monitored by the sensor unit with use of the position of the train, a speed of the train, and the map information; and
 a fourth step, by the sensor optical axis control unit, of correcting the monitoring area determined by the monitoring area determination unit on the basis of the attitude angle of the train and performing control to cause the direction of the optical axis of the sensor unit to be on the course of the train with use of the drive mirror.

18. The obstacle detection method according to claim 11, wherein the optical element comprises a beam splitter.

19. The obstacle detection method according to claim 11, wherein the optical element comprises a dichroic mirror.

20. The obstacle detection method according to claim 11, wherein the optical element transmits a laser beam emitted from the laser distance measuring device and outputs the laser beam to the drive mirror.

* * * * *